2,790,745
Patented Apr. 30, 1957

2,790,745

AMIDE RODENT REPELLENT COMPOSITIONS

Newton H. Shearer, Jr., and Harry W. Coover, Jr., Kingsport, Tenn., assignors to Eastman Kodak Company, Rochester, N. Y., a corporation of New Jersey No Drawing. Application July 29, 1954,
Serial No. 446,642

6 Claims. (Cl. 167—46)

This invention relates to materials which are effective in repelling rodents such as mice, squirrels, beavers, porcupines and rabbits, and to compositions containing such materials. Rodent damage to stored foods in warehouses has been estimated to run as high as 20% of the total value of the stored food. The need for some material which would effectively repel rodents has been generally recognized not only by warehousemen but also by farmers, food processors and householders. The annual economic loss, due to rats and other rodents, has been estimated at between one and two billion dollars.

The Fish and Wildlife Service of the U. S. Department of the Interior has tested more than 2,700 chemicals as rodent repellents. Only a few are considered at present to have merit as rodent repellents, for example, actidione, zinc dimethyldithiocarbamate cyclohexylamine complex, tetramethylthiuram disulfide, rosin amine D and complexes of trinitrobenzene such as the aniline complex. Actidione, an antibiotic, is too expensive for commerical use and is employed only as a laboratory standard. Examples of the classes of compounds which are considered active repellents are the guanidines, the primary, secondary and tertiary amines and their salts with acetic, hydrochloric and picric acids, nitro compounds, phenols, quarternary ammonium salts and thiocyanates. Amides, acids, alcohols, ethers and nitriles have been generally ineffective.

An object of this invention is to provide new materials which are effective rodent repellents. Another objective is to provide effective rodent repellents which are more economical than the present agents.

Although amides as a class are considered to be generally ineffective as rodent repellents, we have surprisingly discovered certain compounds of exceptional activity among the class of acrylamides, methacrylamides and hydracrylamides, and specifically the N-monosubstituted derivatives of acrylamide, of methacrylamide and of hydracrylamides. Evaluation of the rodent repellent activity of these compounds was carried out by use of a food acceptance technic which is described in the following publication: Rodent Repellent Studies, I Development of An Index Number for Expressing Degrees of Repellent Activity, E. Bellach, J. B. De Witt, J. Am. Pharm. Soc. (Sci. Ed.) 38 (2) 109–112 (1949). According to this technic, healthy young rats are used, together with a normal laboratory diet. The food was ground to pass a 10-mesh standard screen, and the treated food generally contained 2% by weight of the sample being tested, well mixed with the food. The following procedure is quoted from page 110 of the above article:

"Each experimental group consisted of three or more rats, housed in individual cages, and furnished water ad libitum. The rats had been maintained on the untreated experimental diets for a period of at least one week prior to the start of the test. At the beginning of the test, each animal was provided with a suitable food cup containing 20 gm. of the untreated food, and a similar cup containing 20 gm. of the treated food. No other food was available to the rats during the test period. The amount of food remaining in the cups was weighed each twenty-four hours during the four-day experimental period, and the cups returned to the cages. The animals, and any residual food, were discarded at the end of the experiment."

By a formula explained in the above article, a repellency index is calculated for any given material under test.

An index number greater than 85 is indicative of repellent activity and 100 is the highest possible index number. The materials described in this invention were tested at a 2% concentration in the food.

The compounds of the present invention may be readily prepared by the usual methods for making substituted amides, for example, by the reaction of nitriles with secondary or tertiary alcohols or alkenes in the presence of sulfuric acid, or by the reaction of acid chlorides with amines, or by the aminolysis of esters using amines, etc. This invention is further illustrated by the following examples.

*Example I.—Acrylamides*

The bioassay procedure referred to above was used in food acceptance type tests to give the following index numbers for the indicated compounds: N-1,1,3,3-tetramethylbutylacrylamide 99.5, N-isopropylacrylamide 96.1, N-t-butylacrylamide 92.1.

*Example II.—Methacrylamides*

The procedure of Example I was followed to obtain an index number of 87.5 for N-isopropylmethacrylamide.

Examples of foods in which the repellents of the invention are effective are: a normal laboratory diet for rats or any of the grains normally eaten by rodents, for example, wheat, rye, corn, barley and rice.

*Example III*

The procedure of Example I was followed to obtain an index number of 94.1 for N-1,1,3,3-tetramethylbutylhydracrylamide.

We claim:

1. A food normally eaten by rodents and containing a rodent repelling quantity of a compound selected from the group consisting of N-(1,1,3,3-tetramethylbutyl)acrylamide, N-isopropylacrylamide, N-tert-butylacrylamide, N-isopropylmethacrylamide, N-(1,1,3,3-tetramethylbutyl)-hydracrylamide.

2. A food normally eaten by rodents and containing a rodent repelling quantity of N-1,1,3,3-tetramethylbutyl-acrylamide.

3. A food normally eaten by rodents and containing a rodent repelling quantity of N-isopropylacrylamide.

4. A food normally eaten by rodents and containing a rodent repelling quantity of N-t-butylacrylamide.

5. A food normally eaten by rodents and containing a rodent repelling quantity of N-isopropylmethacrylamide.

6. A food normally eaten by rodents and containing a rodent repelling quantity of N-1,1,3,3-tetramethylbutyl-hydracrylamide.

OTHER REFERENCES

Chemical-Biological Coordination Center Review No. 5, published May 8, 1953, by National Research Council, Washington, D. C., pp. 65–67.